May 24, 1932.  J. S. BELT  1,860,009
BATH APPARATUS
Filed Nov. 3, 1930    2 Sheets-Sheet 1

Joseph S. Belt,
INVENTOR.

BY J. Stanley Burch
ATTORNEY.

May 24, 1932. J. S. BELT 1,860,009
BATH APPARATUS
Filed Nov. 3, 1930  2 Sheets-Sheet 2
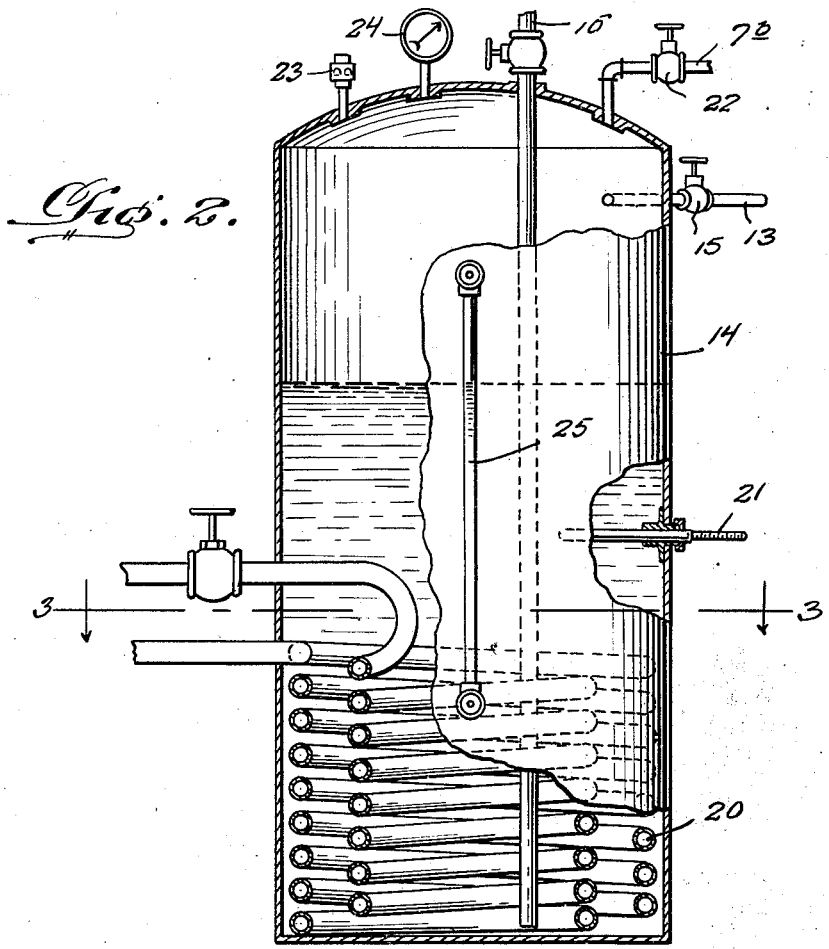
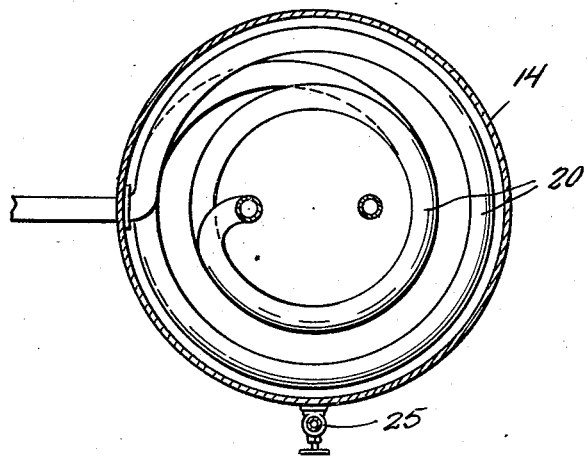
Joseph S. Belt,
INVENTOR.
BY J. Stanley Burch
ATTORNEY.

Patented May 24, 1932

1,860,009

UNITED STATES PATENT OFFICE

JOSEPH S. BELT, OF AMARILLO, TEXAS

BATH APPARATUS

Application filed November 3, 1930. Serial No. 493,211.

The present invention relates to bath apparatus, and has more particular reference to an improved means for supplying warm carbonated water to bath tubs for bathing purposes.

It is well known that carbonated water when used for bathing purposes is invigorating and healthful, and apparatus for supplying such water for such purposes have been heretofore proposed. However, such prior apparatus have been more or less objectionable or unsatisfactory for various reasons. In modern homes or like places it is objectionable to have an apparatus local to the bath tub for carbonating the water after the latter has been placed in the tub, as suggested in most prior apparatus. Moreover, in such cases, extreme care must be exercised and much time consumed in carbonating the water, and even then the water is not thoroughly impregnated and much gas escapes and is wasted. Moreover, if more carbonated water is desired, a new quantity of water must be supplied to the tub and then carbonated, a method which is slow and time-consuming.

The primary object of the present invention, therefore, is to provide an improved apparatus for supplying carbonated water for bathing purposes, whereby a continuous supply of water under pressure and thoroughly impregnated with liquid carbon dioxide or carbonic acid is had to be drawn off as desired for use.

A further object is to provide an apparatus of the above kind which may be placed where most convenient remote from the bath tub and connected with the ordinary water supply faucet of the latter, and which will operate with a minimum amount of attention and without wasteful use of the carbonic acid.

The invention consists in the novel form, combination and arrangement of parts hereinafter more fully described, shown in the accompanying drawings, and claimed.

In the drawings:

Figure 2 is a view, partly in elevation and partly in vertical section, of the carbonated water tank forming part of the apparatus shown in Figure 1; and Figure 3 is a horizontal section taken substantially on line 3—3 of Figure 2.

Figure 1:
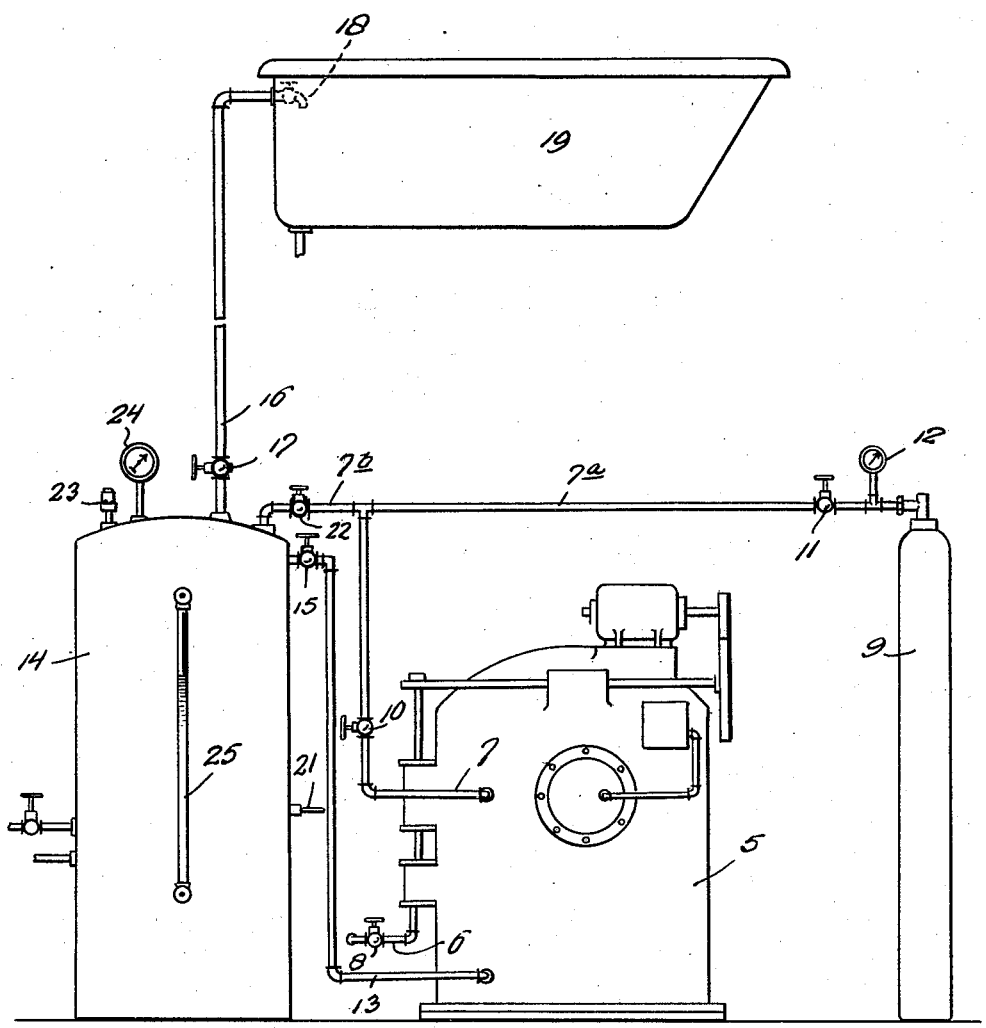
Figure 1 is a diagrammatic elevation of a bath apparatus embodying the present invention.

Referring in detail to the drawings, 5 indicates a conventional type of automatic carbonating machine such as is commonly employed in apparatus for carbonating beverages, and which has an inlet pipe 6 for the liquid to be carbonated and an inlet pipe 7 for the gas by which such liquid is carbonated. The inlet pipe 6 is connected to a continuous source of water supply, such as a city water supply main, and has therein a suitable control or shutoff valve 8. Connected with the gas inlet pipe 7 by a supply line 7a is the outlet of an ordinary tank or flask 9 charged with liquid carbon dioxide under high pressure. The pipe 7 has a control valve 10, while a pressure regulator valve 11 is arranged in the line 7a adjacent the tank 9 and a pressure gage 12 is connected to said line 7a between the regulator valve 11 and the tank 9. Leading from the carbonator or carbonating machine 5 is an outlet pipe 13 for the carbonated water.

Arranged near the carbonator 5 is a storage tank 14 into the top of which the carbonated water outlet pipe 13 discharges. The pipe 13 has a suitable control valve 15, and the tank 14 is provided with an outlet pipe 16 which has a control valve 17 and extends from the bottom of said tank to a faucet 18 arranged to discharge in a bath tub 19. Means is provided for heating the carbonated water within the tank so that it will be at a temperature suitable for bathing purposes when drawn off into the tub 19. As shown, this heating means may embody a heating coil 20 arranged in the bottom of the tank 14 and through which a suitable heating medium, such as hot water or steam is circulated. A thermometer 21 is provided to indicate the temperature of the carbonated water in the tank 14 so that maintenance of the carbonated water at the desired temperature is facilitated. The gas supply line 7a has a branch 7b communicating with the top of tank 14 and provided with a control or shut-off valve 22. The tank 14 is provided at the top with a safety relief valve 23 and a pressure gage 24, while a gage 25 is carried by said tank to visibly indicate the level of the carbonated water therein.

In use, the valve 22 and faucet 18 are normally closed, while the valves 8, 10, 15 and 17 are open. When the latter valves are initially opened, the carbonator is thrown in operation so that water supplied thereto by the pipe 6 is thoroughly carbonated therein by the gas evolved from the liquid discharged from the tank 9 and supplied to the carbonator 5 through the line 7a and pipe 7. As the water is carbonated, it is discharged through pipe 13 into the tank 14 and charged therein under pressure. When the pressure in the tank 14 reaches a predetermined point, the carbonator is automatically thrown out of operation by the usual well-known or any preferred automatic control means with which this type of carbonator is ordinarily employed. If desired, the faucet 18 may be opened for a short period at this time to allow the carbonated water to drive air from and fill the pipes 13 and 16. A certain amount of gas will naturally accumulate in the top of tank 14 and exert a pressure on top of the carbonated water in the lower portion of the latter so that such carbonated water will be forced into the tub 19 whenever the faucet 18 is opened. This pressure in the upper portion of tank 14 may be augmented when desired by opening valve 22 and supplying gas under pressure directly thereto, and it will be automatically relieved or reduced under abnormal conditions by means of the safety relief valve 23. It is thus apparent that by opening the faucet 18, a continuous supply of warm carbonated water may be had at all times at a temperature suitable for bathing purposes.

Minor changes may be made in the specific construction shown and described without departing from the spirit and scope of the invention as claimed.

It is to be understood that the terms "automatic carbonating machine" and "automatic carbonator," as used herein, are specifically intended to refer to a well-known commercial machine of the type shown in U. S. Letters Patent No. 1,246,498, issued Nov. 13, 1917, to Toussaint, et al., wherein a small capacity tank to receive the carbonated water is constantly connected with the sources of carbonic gas and water supply, and wherein a motor-operated pump forces the water and gas into the carbonator tank under pressure, means being provided to automatically throw the pump into operation when the carbonated water reaches a predetermined low level in the carbonator tank and to throw the pump out of operation when the carbonated water reaches a predetermined high level in said tank. By placing the tank of the carbonator in communication with the large capacity storage tank 14, the carbonated water is forced into tank 14 until the pressure in the top of the latter tank equals that in the carbonator tank, at which time the tank 14 has been nearly filled to the desired level. Further carbonation of water in the carbonator then acts to raise the level in the carbonator tank until the pump is automatically thrown out of operation. When the carbonated water is drawn from storage tank 14, the pressure in the top of the latter is lowered, and addtional carbonated water passes from the carbonator tank to storage tank 14. This lowers the level of carbonated water in the carbonator tank so as to automatically throw the carbonator into operation and provide a continuous supply of carbonated water, which carbonated water may be heated at will as it is forced under pressure from the storage tank 14 for use. By use of the storage tank 14 in the manner and relation disclosed herein, a complete tempered carbonated bath is had on hand at all times without having to wait for the slow operation of the low capacity carbonating equipment which is used. At the same time, such commercial carbonating equipment is effectively utilized so as to avoid the necessity of special large capacity carbonating equipment, whereby a relatively inexpensive and efficient bath apparatus is had involving mainly available commercial devices which may be readily combined and set up for use for the particular purpose contemplated herein.

What I claim is:

1. A bath apparatus comprising, in combination with a bath tub or the like having a water supply faucet, an automatic carbonating machine having a tank of small capacity for receiving the water as it is carbonated under pressure, means affording a constant supply of water and carbon dioxide gas for said carbonating machine, a tank of relatively large capacity in constant communication with the tank of said carbonating machine and adapted to receive and store under pressure the water carbonated by the latter, and an outlet for the carbonated water extending from the bottom of said storage tank to said supply faucet of the bath tub or the like, whereby the pressure of gas in the top of said storage tank is utilized to force the carbonated water from said storage tank to the bath tub or the like.

2. A bath apparatus comprising, in combination with a bath tub or the like having a water supply faucet, an automatic carbonating machine having a tank of small capacity for receiving the water as it is carbonated under pressure, means affording a constant supply of water and carbon dioxide gas for said carbonating machine, a tank of relatively large capacity in constant communication with the tank of said carbonating machine and adapted to receive and store under pressure the water carbonated by the latter, an outlet for the carbonated water extending from the bottom of said storage tank to said supply faucet of the bath tub or the like, whereby the pressure of gas in the top of said storage tank is utilized to force the carbonated water from said storage tank to the bath tub or the like, and means operable at will to heat the carbonated water in the bottom of said storage tank.

3. A bath apparatus comprising, in combination with a bath tub or the like having a water supply faucet, an automatic carbonating machine having a tank of small capacity for receiving the water as it is carbonated under pressure, means affording a constant supply of water and carbon dioxide gas for said carbonating machine, a tank of relatively large capacity in constant communication with the tank of said carbonating machine and adapted to receive and store under pressure the water carbonated by the latter, an outlet for the carbonated water extending from the bottom of said storage tank to said supply faucet of the bath tub or the like, whereby the pressure of gas in the top of said storage tank is utilized to force the carbonated water from said storage tank to the bath tub or the like, and means operable at will to supply carbon dioxide gas under pressure directly into the top of said storage tank.

In testimony whereof I affix my signature.

JOSEPH S. BELT.